Aug. 6, 1929.  R. JEFFREY  1,723,863
TROUBLE LIGHT MIRROR SYSTEM
Filed July 14, 1928
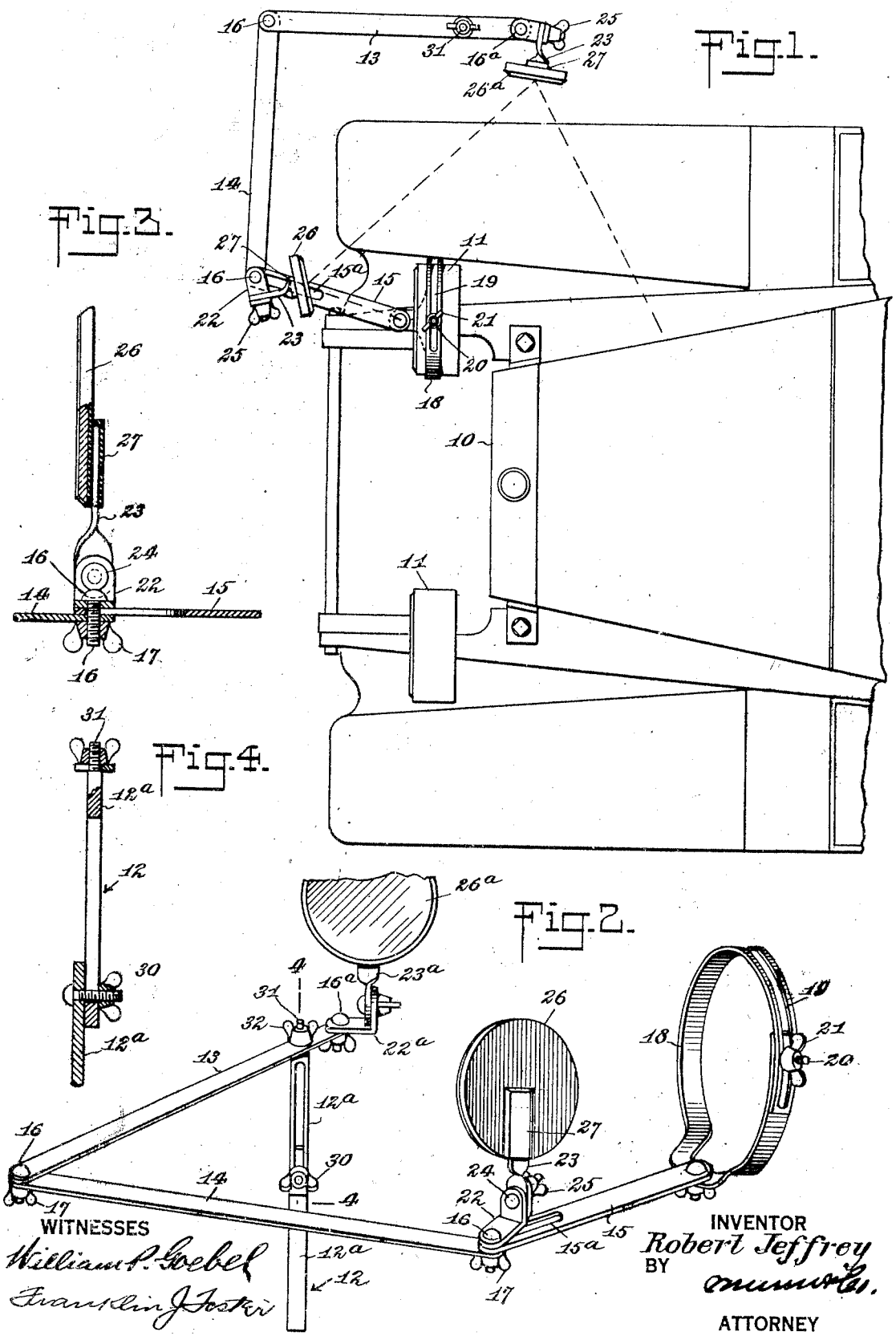
WITNESSES
INVENTOR
Robert Jeffrey
BY
ATTORNEY Patented Aug. 6, 1929.

1,723,863

UNITED STATES PATENT OFFICE.

ROBERT JEFFREY, OF NEW YORK, N. Y.

TROUBLE-LIGHT-MIRROR SYSTEM.

Application filed July 14, 1928. Serial No. 292,650.

The present invention is concerned with the provision of an adjustable mirror system which may have a wide range of utility but which is primarily designed to serve as a trouble light reflecting system for automobiles.

More specifically an object of the invention is to provide a set of adjustable mirrors which may be adjustably associated with the headlight of a car in such a manner that the light from the headlight will be transmitted by reflection to any desired point. Thus, for instance, I may utilize the light from the headlight to illuminate the engine space under the hood when the latter is lifted or provide the necessary illumination for changing tires, etc.

Other objects of the invention are to provide a system of this character which may be conveniently folded so that it will occupy but a small amount of space when not in use, it may be conveniently associated with or attached to the ordinary headlight of a car and readily adjusted to project a reflected beam from the headlight at any desired point.

Further and more general objects are to provide an apparatus of the character noted above which will be of simple, practical construction, rugged, durable and efficient in use and well suited to the requirements of economical manufacture and convenient manipulation.

With the above noted and other objects in view, the invention consists in certain novel features of construction and combinations and arrangements of parts which will be more fully hereinafter described and pointed out in the claims.

Figure 1 is a top plan view showing the forward end of an automobile with the mirror apparatus of the present invention attached to one of the headlights and reflecting light therefrom on the hood of the car;

Figure 2 is a perspective view of the mirror apparatus;

Figure 3 is a vertical, sectional detail showing the method of mounting one of the mirrors;

Figure 4 is a vertical, sectional detail showing the method of adjusting the supporting standard.

In the drawings I have used the reference numeral 10 to designate generally an automobile provided with the usual front headlight casings 11 of the drum type. My improved mirror system is preferably partially supported by one of the headlight casings and partially supported by a standard 12.

The apparatus includes three links 13, 14 and 15, the central link 14 being pivoted at its ends to the ends of the links 13 and 15. Preferably, bolts 16 and wing nuts 17 serve to effect the pivotal connection so that the parts may be readily manually adjusted and conveniently locked in any position of pivoted adjustment.

The free end of the link 15 carries an adjustable annular collar member 18 in the nature of a spring band adapted to be clamped about one of the headlight casings 11. Any conventional adjustment means may be used for circumferentially adjusting the band. I have illustrated the band as provided with a slot 19 at one end receiving a screw 20 carried by the other end of the band, and the band ends being locked against sliding in their overlapped position by the use of a wing nut 21. The band may be lined with felt or rubber.

The pivot screw 16 which connects the links 14 and 15 also passes through a bracket 22 upon which a mirror supporting standard 23 is pivoted. The standard 23 is adjustable about a pivot screw 24 extending through the vertical portion of the bracket 22 and equipped with a wing nut 25.

A mirror 26 is removably attached to standard 23, the mirror being preferably formed with a sleeve 27 on its back which is slipped over the standard 23.

At the free end of the link 13 another mirror 26$^a$ is similarly mounted upon a standard 23$^a$ carried by a bracket 22$^a$, the latter being pivoted as at 16$^a$ to the free end of the link 13.

Obviously when the mirrors are in certain positions the free end of the link 13 will be quite remote from the band 18 and supplemental supporting means is desirable for the mirror 26$^a$. The standard 12 serves as supporting means, this standard being composed of a pair of vertically adjustable sections 12$^a$ which may be locked in adjusted position by a wing nut 30. The upper end of the standard carries a reduced threaded extension 31 projecting through the link 13 near the free end of the latter and receiving a wing nut 32.

Where a more complicated system of linkage is used it will be obvious that additional standards or supplemental supports might be employed. It will also be obvious that instead of attaching one end of the link train to the headlight of the car it might be secured in any other convenient position.

In use, the band 18 is clamped on the headlight of the car, standard 12 adjusted to the proper length, and the links and mirrors manipulated to a position where the mirrors serve to project a reflected beam of light from the headlight at the point where visibility is desired. In Figure 1 I have shown the mirror set to direct a beam from the headlight on or under the hood of the car to permit convenient repair of the engine. The use of the wing nuts or equivalent means throughout serve to permit ready adjustment of the various adjustable parts of the device and also permits the parts when once adjusted to be quickly locked in proper position.

When the trouble light mirror system is not in use it may be completely disassembled, or the mirrors and standard may be conveniently removed from the links and the links and collar compactly folded. It will be apparent from Figure 2 of the drawings that the mirrors have a substantially universal adjustment relatively to the points 16, 16ª to which their brackets are connected, and that the mirrors may be conveniently set to reflect a beam from the headlight in any desired direction.

Obviously various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A trouble light mirror system, including a plurality of adjustably connected links, a plurality of mirrors adjustably connected at different points to said link train, means for attaching one end of the link train to the headlight of a car, and means for supporting the free end of the link train.

2. A trouble light mirror system, including a plurality of adjustably connected links, a plurality of mirrors adjustably connected at different points to said link train, means for attaching one end of the link train to the headlight of a car, and means for supporting the free end of the link train, comprising a vertically adjustable standard.

3. A trouble light mirror system for automobiles, including a train of pivotally adjustably connected links, means for supporting the train at one end on a car adjacent the headlight thereof, brackets pivoted on the train, and mirrors adjustable on the brackets.

4. A trouble light mirror system for automobiles, including a train of pivotally adjustably connected links, means for supporting the train at one end on a car adjacent the headlight thereof, brackets pivoted on the train, and mirrors adjustable on the brackets, said brackets including adjustably mounting standards to which the mirrors are detachably connected.

5. A trouble light mirror system for automobiles, including a train of pivotally adjustably connected links, means for supporting the train at one end on a car adjacent the headlight thereof, brackets pivoted on the train, and mirrors adjustable on the brackets, said brackets including adjustably mounting standards to which the mirrors are detachably connected, the means for supporting the end of the train comprising a clamping band engageable with the headlight casing.

6. A trouble light mirror system for automobiles, including a train of pivotally adjustably connected links, means for supporting the train at one end on a car adjacent the headlight thereof, brackets pivoted on the train, mirrors adjustable on the brackets, said brackets including adjustably mounting standards to which the mirrors are detachably connected, the means for supporting the end of the train comprising a clamping band engageable with the headlight casing, and an extensible standard for supporting the opposite end of the link train.

Signed at New York, in the county of Bronx and State of New York, this 10th day of July, A. D. 1928.

ROBERT JEFFREY.